(12) United States Patent
Jing

(10) Patent No.: US 11,734,455 B2
(45) Date of Patent: Aug. 22, 2023

(54) BLOCKCHAIN-BASED DATA PROCESSING METHOD AND APPARATUS, DEVICE, AND STORAGE MEDIUM

(71) Applicant: Beijing Baidu Netcom Science Technology Co., Ltd., Beijing (CN)

(72) Inventor: Bo Jing, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/082,356

(22) Filed: Dec. 15, 2022

(65) Prior Publication Data
US 2023/0195940 A1 Jun. 22, 2023

(30) Foreign Application Priority Data

Dec. 16, 2021 (CN) .......................... 202111536613.3

(51) Int. Cl.
*G06F 21/64* (2013.01)
(52) U.S. Cl.
CPC .................... *G06F 21/64* (2013.01)
(58) Field of Classification Search
CPC .......... G06F 21/64; G06F 21/62; G06F 21/30; H04L 9/32; H04L 9/3247; H04L 9/3236; H04L 67/104
See application file for complete search history.

(56) References Cited

U.S. PATENT DOCUMENTS

| | | | |
|---|---|---|---|
| 2021/0075870 A1 | 3/2021 | Kempf et al. | |
| 2021/0103603 A1* | 4/2021 | Iftemi | G06F 16/9024 |
| 2021/0297262 A1* | 9/2021 | Fang | G06F 9/54 |
| 2021/0297418 A1* | 9/2021 | Fang | H04L 63/0407 |
| 2021/0349770 A1* | 11/2021 | Fang | H04L 9/3239 |
| 2021/0382620 A1* | 12/2021 | Fang | H04L 9/3218 |
| 2021/0382831 A1* | 12/2021 | Sun | H04L 9/0861 |

(Continued)

FOREIGN PATENT DOCUMENTS

| CN | 1737721 A | 2/2006 |
|---|---|---|
| CN | 108648084 A | 10/2018 |
| CN | 111143880 A | 5/2020 |

(Continued)

OTHER PUBLICATIONS

Apr. 26, 2022—(CN) Notification to Grant Patent Rights—202111536613.3 w/ machine translation.

*Primary Examiner* — Khalid M Almaghayreh
(74) *Attorney, Agent, or Firm* — Banner & Witcoff, Ltd.

(57) ABSTRACT

Provided are a blockchain-based data processing method and apparatus, a device, and a storage medium, which relate to the field of blockchain technology and can be used for cloud computing and cloud services. The specific implementation is: in response to a data usage request initiated by a data user, acquiring a signature result from an entrusted signer associated with to-be-used data after the entrusted signer audits the data user; calling a lease smart contract according to the data usage request to determine a signature verification key of the entrusted signer associated with the to-be-used data; performing verification on the signature result according to the signature verification key; and in a case where the verification passes, feeding back the to-be-used data to the data user. Therefore, the usage security of data can be improved.

12 Claims, 7 Drawing Sheets

(56) References Cited

U.S. PATENT DOCUMENTS

2022/0224545 A1* 7/2022 Wan .................. H04L 67/104
2023/0097738 A1* 3/2023 Li ........................ H04L 9/50
713/176

FOREIGN PATENT DOCUMENTS

| CN | 111294379 | A |   | 6/2020  |         |           |
|----|-----------|---|---|---------|---------|-----------|
| CN | 111934890 | A |   | 11/2020 |         |           |
| CN | 112184441 | A | * | 1/2021  | ....... | G06F 16/27 |
| CN | 112187471 | A |   | 1/2021  |         |           |
| CN | 112287379 | A |   | 1/2021  |         |           |
| CN | 112532646 | A |   | 3/2021  |         |           |
| CN | 113792318 | A |   | 12/2021 |         |           |
| WO | 2020192743 | A1 |  | 10/2020 |         |           |
| WO | WO-2021186754 | A1 | * | 9/2021 |      |           |

* cited by examiner

_US 11,734,455 B2_

BLOCKCHAIN-BASED DATA PROCESSING METHOD AND APPARATUS, DEVICE, AND STORAGE MEDIUM

CROSS-REFERENCE TO RELATED APPLICATION(S)

This application claims the priority to Chinese Patent Application No. CN202111536613.3 and filed on Dec. 16, 2021, the disclosure of which is incorporated herein by reference in its entirety.

TECHNICAL FIELD

The present disclosure relates to the field of computer technologies, in particular, the blockchain technology, and may be used for cloud computing and cloud services.

BACKGROUND

With the development of computer technology, massive private and high-value data need to be stored and used safely. Data owners are faced with huge storage pressure and need a storage service to store the data generated by data owners by using idle storage resources. At this point, it is critical to ensure the usage security of data stored in idle storage resources.

SUMMARY

The present disclosure provides a blockchain-based data processing method and apparatus, a device, and a storage medium.

According to an aspect of the present disclosure, a blockchain-based data processing method is provided. The method includes the steps below.

In response to a data usage request initiated by a data user, a signature result fed back by an entrusted signer associated with to-be-used data after the entrusted signer audits the data user is acquired.

A lease smart contract is called according to the data usage request to determine a signature verification key of the entrusted signer associated with the to-be-used data.

Verification on the signature result is performed according to the signature verification key.

If the verification passes, the to-be-used data is fed back to the data user.

According to another aspect of the present disclosure, a blockchain-based data processing method is provided. The method includes the steps below.

In response to determining that a data usage demand exists, a lease smart contract associated with to-be-used data is called to determine a data storage party of the to-be-used data.

A data usage request is initiated to the data storage party, and to-be-used data is acquired from the data storage party.

According to another aspect of the present disclosure, an electronic device is provided. The electronic device includes at least one processor and a memory that is in a communication connection with the at least one processor.

The memory is configured to store instructions executable by the at least one processor, where the instructions are executed by the at least one processor to enable the at least one processor to perform the blockchain-based data processing method of any one of the embodiments of the present disclosure.

According to another aspect of the present disclosure, a non-transitory computer-readable storage medium is provided. The storage medium is configured to store computer instructions, where the computer instructions are used for enabling a computer to perform the blockchain-based data processing method of any one of the embodiments of the present disclosure.

The technical solutions of the present disclosure can improve the usage security of data.

It is to be understood that the content described herein is not intended to identify key or important features of the embodiments of the present disclosure nor is it intended to limit the scope of the present disclosure. Other features of the present disclosure will be readily understood through the following description.

BRIEF DESCRIPTION OF DRAWINGS

The drawings are intended to provide a better understanding of the present solution and do not constitute a limitation of the present disclosure. In the drawings.

DETAILED DESCRIPTION

Example embodiments of the present disclosure, including details of the embodiments of the present disclosure, are described hereinafter in conjunction with the drawings to facilitate understanding. The example embodiments are merely illustrative. Therefore, it will be appreciated by those having ordinary skill in the art that various changes and modifications may be made to the embodiments described herein without departing from the scope and spirit of the present disclosure. Similarly, the description of well-known functions and constructions is omitted hereinafter for clarity and conciseness.

Figure 1:
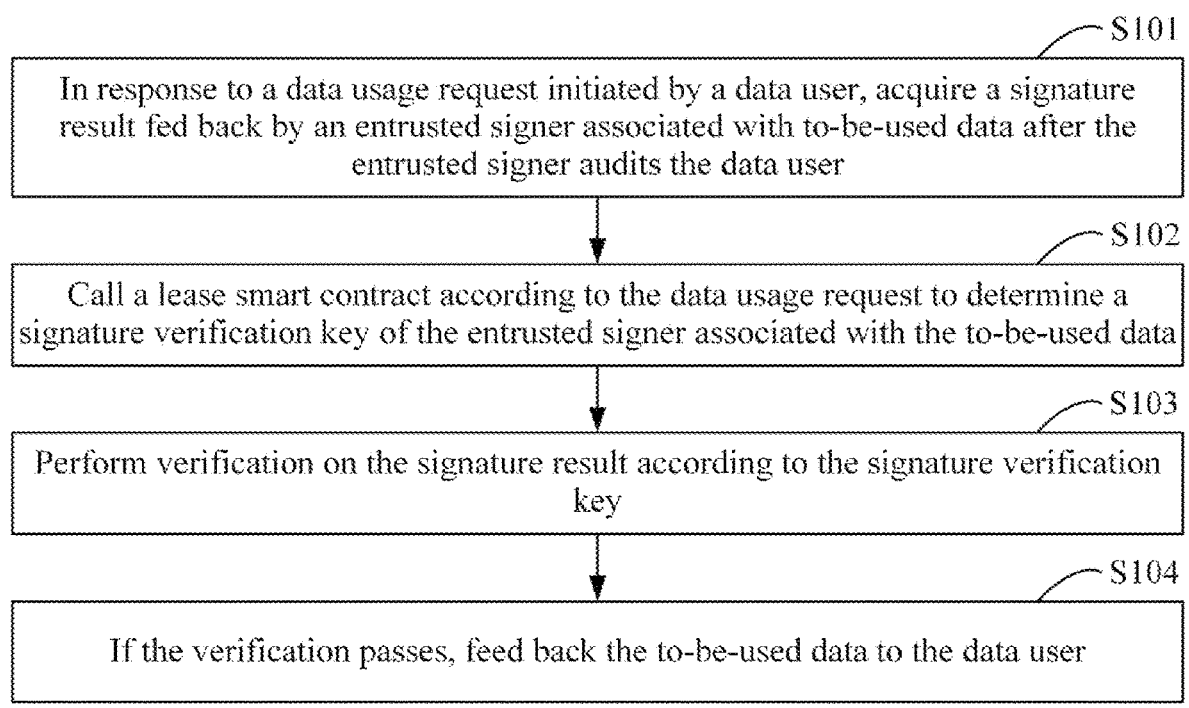
FIG. 1 is a flowchart of a blockchain-based data processing method according to an embodiment of the present disclosure.

FIG. 1 is a flowchart of a blockchain-based data processing method according to an embodiment of the present disclosure. This embodiment of the present disclosure is applicable to the scenario of safely using the data stored by a data storage party based on the blockchain technology. The entire blockchain-based data processing method is performed by the cooperation of a data user, a data storage party and an entrusted signer. The data user is a party that needs to use the data stored by the data storage party. The data user may be a party having a direct or indirect data usage demand. For example, if the user A wants to use data for model training, the user A is a data user having a direct data usage demand; if the user A has insufficient computing power and needs to entrust the agent B to acquire data for model training, then the agent B is a data user having an indirect data usage demand. The data storage party is a party that provides storage resources for the data owner to store the data of the data owner. The computing device of the data storage party of this embodiment includes at least one of an access control layer or a data processing layer; where the data processing layer is used for providing data for the data user, and the access control layer is located before the data processing layer and is used for performing verification on the access authority of the data user before providing the data for the data user. The entrusted signer is an organization that is trusted by the data owner and able to provide services such as auditing and signing. The entrusted signer is specifically used for, when the data user requests to use the data of the data owner, auditing the authority of the data user according to the usage authority configured by the data owner for the data of the data owner, and generating a signature result after the audit passes. Optionally, the entrusted signers trusted by different data owners may be the same or different.

The blockchain-based data processing method in this embodiment may be performed by a blockchain-based data processing apparatus. The apparatus may be implemented by software and/or hardware and may be integrated into a computing device carrying the data storage party. As shown in FIG. 1, the blockchain-based data processing method provided by this embodiment may include the steps described below.

In S101, in response to a data usage request initiated by a data user, a signature result fed back by an entrusted signer associated with to-be-used data after the entrusted signer audits the data user is acquired.

The data usage request may be a request initiated by the data user when the data user has the data usage demand Optionally, when the data user has the data usage demand, the data user may first determine the data storage party that stores the to-be-used data and then initiate a data usage request to the data storage party based on the relevant information (such as data identification information) of the to-be-used data. The to-be-used data may be the data that the data user wants to acquire from the data storage party and use. For example, in a case where it is determined that a data usage demand exists, a lease smart contract associated with the to-be-used data may be called to determine the data storage party of the to-be-used data, and a data usage request is initiated to the data storage party. The lease smart contract may be a code segment written based on the plug-in mechanism and is specially used for dealing with data storage transactions between the data owner and the data storage party. For example, data storage transactions between the data owner and the data storage party are matched based on the lease smart contract, and the storage relationship between the data owner and the data storage party is recorded in the lease smart contract. Optionally, the lease smart contract is usually stored in a blockchain network or may be stored locally by a participant (such as the data storage party or the data owner) of the storage transaction corresponding to the lease smart contract. It is to be noted that in this embodiment, each data storage transaction between the data owner and the data storage party corresponds to a lease smart contract.

The signature result may be a signature result generated by the entrusted signer according to a preset signature rule after the data user passes the authority audit of the entrusted signer. For example, the signature result may be obtained by signing to-be-audited information (such as the identification information of the data user, the identification of the to-be-used data or data use) during the authority audit using a key of an entrusted agent. Optionally, the process where the entrusted signer audits the authority of the data user may include, but is not limited to, whether the data user is authorized by the data owner is audited according to the identification of the data user; whether the to-be-used data is authorized by the data owner is audited according to the identification information of the to-be-used data; whether the data use is authorized by the data owner is audited according to the data use; and the authority of the data user is audited according to at least two kinds of information of the identification of the data user, the identification information of the to-be-used data and the data use and is not limited to this embodiment.

It is to be noted that the entrusted signer of this embodiment may be composed of at least one participant, and if the entrusted signer is composed of multiple participants, the signature result may be one signature result corresponding to each participant or a joint signature result (such as a threshold signature result) generated by the multiple participants and is not limited to this embodiment.

Optionally, in this embodiment, the access control layer of the computing device of the data storage party (that is, the access control layer of the data storage party) acquires and responds to the data usage request initiated by the data user and then acquires according to the data usage request the signature result fed back by the entrusted signer associated with the to-be-used data after the entrusted signer audits the data user. Specifically, the signature result fed back by the entrusted signer after the entrusted signer audits the data user may be acquired according to the data usage request in many manners, and the manners are not limited to this embodiment.

One manner is that the data user requests the entrusted signer to audit the data user itself, carries the signature result generated by the entrusted signer after the signature passes in a data usage request, and sends the data usage request to the data storage party. For example, the data user may call the lease smart contract associated with the to-be-used data to determine the entrusted signer associated with the to-be-used data; initiate a data authorization request to the entrusted signer, and acquire a signature result from the entrusted signer after the entrusted signer audits the data user in response to the data authorization request; and initiate the data usage request carrying the signature result to the data storage party. In this manner, the access control layer of the data storage party may acquire from the data usage request initiated by the data user the signature result fed back by the entrusted signer associated with the to-be-used data after the entrusted signer audits the data user. For example, the signature result fed back by the entrusted signer associated with the to-be-used data after the entrusted signer audits the data user may be looked up and acquired from relevant fields in the data usage request. The advantage of such a setting is that the efficiency of acquiring the signature result is improved, and the efficiency of the access control layer of the data storage party to perform verification on the access authority of the data user is further improved, so as to quickly feed back the to-be-used data to the data user.

Another manner is that when the data usage request does not carry the signature result fed back by the entrusted signer, the access control layer of the data storage party may call the lease smart contract associated with the to-be-used data according to the data usage request to determine the entrusted signer trusted by the data owner to which the to-be-used data belongs, request the entrusted signer to audit the data user that initiates the data usage request, and acquire the signature result from the entrusted signer after the audit of the data user passes.

Another manner is that the data user initiates the data authorization request to the entrusted signer associated with the to-be-used data while initiating the data usage request to the data storage party. The entrusted signer approves the audit of the data user, generates the signature result, and directly feeds back the signature result to the data storage party. At this point, the access control layer of the data storage party may call the lease smart contract associated with the to-be-used data according to the data usage request, determine the entrusted signer trusted by the data owner to which the to-be-used data belongs, and receive the signature result from the entrusted signer.

In S102, a lease smart contract is called according to the data usage request to determine a signature verification key of the entrusted signer associated with the to-be-used data.

The signature verification key may be a key required to perform verification on the signature result generated by the entrusted signer. For example, if the signature result is obtained by the entrusted signer based on its private key, the signature verification key may be the public key of the entrusted signer. It is to be noted that when the entrusted signer is composed of multiple participants, if the signature result generated by the entrusted signer is one signature result corresponding to each participant, then the signature verification key may be one signature verification key corresponding to each participant; and if the signature result generated by the entrusted signer is a joint signature result (such as a threshold signature result) generated by multiple participants, the signature verification key may be one common signature verification key corresponding to multiple participants.

It is to be noted that, in this embodiment, since the entrusted signer associated with the to-be-used data is arranged by the data owner to which the to-be-used data belongs, after the data owner conducts a storage transaction with the data storage party, in order to ensure the security of the stored data, the data owner may authorize the entrusted signer to audit the data user that uses the data of the data owner and record the signature verification key of the entrusted signer in the lease smart contract of this storage transaction.

Optionally, if the access control layer of the data storage party wants to perform verification on the signature result fed back by the entrusted signer, the access control layer of the data storage party needs to call the lease smart contract of the storage transaction to which the to-be-used data belongs, executes the relevant logic of acquiring the signature verification key of the entrusted signer, and acquires the signature verification key of the entrusted signer of the data owner to which the to-be-used data belongs.

Specifically, before the access control layer of the data storage party calls the lease smart contract, the access control layer of the data storage party needs to acquire the lease smart contract of the storage transaction to which the to-be-used data belongs from the lease smart contracts of many storage transactions according to the data usage request. Specifically, one possible manner is that when the identification information of the lease smart contract associated with the to-be-used data is carried in the data usage request, the access control layer may look up in the blockchain network or locally based on the identification information and acquire the lease smart contract corresponding to the identification information. another possible manner is that when the data usage request does not carry the identification information of the lease smart contract associated with the to-be-used data, the access control layer may look up in the blockchain network or locally based on the to-be-used data in the data usage request and acquire the lease smart contract of the storage transaction where the identification information the to-be-used data is recorded. It is to be noted that in order to ensure the accuracy and timeliness of the called lease smart contract, in this embodiment, the lease smart contract is preferably looked up and called in the blockchain network.

In S103, verification on the signature result is performed according to the signature verification key.

Optionally, after the access control layer of the data storage party acquires the signature result fed back by the entrusted signer and the signature verification key of the entrusted signer, the access control layer of the data storage party can call the lease smart contract, execute the relevant logic of signature verification, and perform verification on the signature result based on the signature verification key. The specific signature verification logic depends on the signature logic of the entrusted signer and is not limited to this embodiment. For example, if the signature verification key is the public key of the entrusted signer and the signature result is generated by the entrusted signer using its private key, the signature result may be decrypted based on the signature verification key, and if the decryption succeeds, the verification passes.

Optionally, if the signature result in this embodiment is composed of multiple signature results of multiple participants, verification on the signature result generated by each participant may be performed based on the signature verification key of each participant, and if the verification of the signature results of all participants or a certain number of participants passes, the verification passes; if the signature result in this embodiment is one joint signature result of multiple participants, verification on the joint signature result may be performed based on the common signature verification key of each participant, and if the verification passes, the verification passes.

In S104, if the verification passes, the to-be-used data is fed back to the data user.

Optionally, if the verification of the signature result of the entrusted signer through the above steps by the access control layer of the data storage party passes, indicating that the data user that initiated the data usage request has the authority to acquire the to-be-used data, the access control layer may transmit the data usage request to the data processing layer (that is, the data processing layer of the data storage party) of the computing device of the data storage party, and the data processing layer looks up the to-be-used data required by the data user based on the data usage request and feeds back the to-be-used data to the data user.

For example, the identification information of the to-be-used data and data user information may be acquired from the data use request, based on the identification information of the to-be-used data, the data (that is, the to-be-used data) corresponding to the identification information is looked up from various data stored, and then the to-be-used data is fed back to the data user based on the data user information.

It is to be noted that, in this embodiment, if the to-be-used data of the data user is the data of multiple different data owners, the data storage party needs to acquire the signature result of the data user fed back by the entrusted signer of each data owner and acquire the signature verification key of each entrusted signer, and if the verification of the signature result of each entrusted signer based on the signature verification key of each entrusted signer passes, the data storage party feeds back all the to-be-used data to the data user. If the verification of a part of the signature results of the entrusted signer passes, the part of the to-be-used data of the data owners corresponding to the entrusted signers that have passed the verification may be fed back; and all the to-be-used data may not be fed back.

In the technical solution of this embodiment, in response to the data usage request of the data user, the data storage party acquires the signature result fed back by the entrusted signer associated with the to-be-used data after the entrusted signer audits the data user, calls the lease smart contract to determine the signature verification key of the entrusted signer, performs verification on the signature result according to the signature verification key, and if the verification passes, feeds back the to-be-used data to the data user. In this solution, before the data storage party provides the to-be-used data for the data user, the data user needs to pass the audit of the entrusted signer of the data owner to which the to-be-used data belongs, and the signature result fed back by the entrusted signer after the entrusted signer audits the data user also needs to pass the verification. That is, the data user is approved by the entrusted signer (that is, the data owner) before the data user acquires the data of the data owner, thereby ensuring the usage security of the data in a case where the data owner stores its data in the data storage party.

Further, in this embodiment, the process where the lease smart contract is called according to the data usage request to determine the signature verification key of the entrusted signer associated with the to-be-used data may include: identification information of the to-be-used data is determined according to the data usage request; and a lease smart contract associated with the identification information is looked up in a blockchain network, the lease smart contract is called, and the signature verification key of the entrusted signer associated with the to-be-used data is determined. Specifically, if the data user wants to acquire data, the data user at least needs to carry the identification information of the to-be-used data in the data usage request, so in this embodiment, the lease smart contract of a storage transaction where the identification information of the to-be-used data is recorded is looked up in the blockchain network based on the identification information of the to-be-used data carried in the data usage request, the lease smart contract is called, and the relevant logic of acquiring the signature verification key is executed, so as to acquire the signature verification key of the entrusted signer associated with the to-be-used data. The advantage of such a setting is that the data user can accurately acquire the signature verification key of the entrusted signer without the need to add additional information to the data usage request, thereby improving the flexibility and convenience of the acquisition of the signature verification key.

Figure 2:
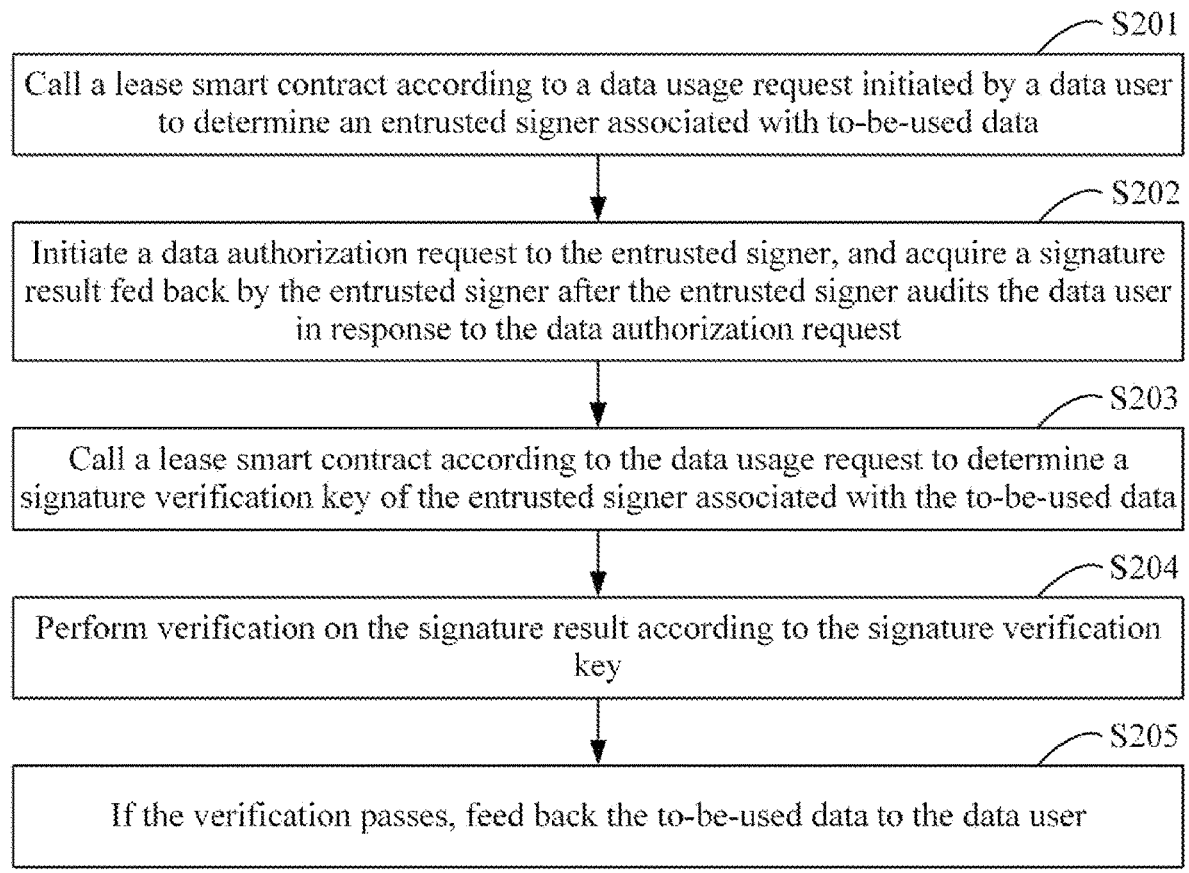
FIG. 2 is a flowchart of another blockchain-based data processing method according to an embodiment of the present disclosure.

FIG. 2 is a flowchart of another blockchain-based data processing method according to an embodiment of the present disclosure. On the basis of the embodiments described above, in this embodiment, the step where in response to the data usage request initiated by the data user, the signature result fed back by the entrusted signer associated with the to-be-used data after the entrusted signer audits the data user is acquired is described in detail below. As shown in FIG. 2, the blockchain-based data processing method provided by this embodiment may include the steps described below.

In S201, the lease smart contract is called according to the data usage request initiated by the data user to determine the entrusted signer associated with the to-be-used data.

The entrusted signer associated with the to-be-used data may be an entrusted signer trusted by the data owner to which the to-be-used data belongs, that is, the entrusted signer can represent the data owner and audit the data user that uses the data of the data owner.

Optionally, in this embodiment, before the access control layer of the data storage party calls the lease smart contract, the access control layer of the data storage party needs to look up the lease smart contract of the storage transaction to which the to-be-used data belongs in the data usage request from multiple lease smart contracts associated with storage transactions based on the data usage request, then call the lease smart contract, and execute the relevant logic of acquiring the entrusted signer, so as to acquire the entrusted signer associated with the to-be-used data.

Optionally, if the to-be-used data in this embodiment includes data of multiple data owners, for each data owner, the lease smart contract associated with the part of the to-be-used data belonging to each data owner is located according to the part of the to-be-used data, and then the associated lease smart contract is called to determine the entrusted signer of each data owner. That is, the entrusted signer of each data owner needs to be determined.

In S202, a data authorization request is initiated to the entrusted signer, and the signature result fed back by the entrusted signer after the entrusted signer audits the data user in response to the data authorization request is acquired.

The data authorization request may be a request initiated to the entrusted signer of the data owner when the data user uses the data of the data owner to request the entrusted signer to audit whether the data user has the authority to use the data.

Optionally, after the access control layer of the data storage party determines the entrusted signer associated with the to-be-used data, the access control layer of the data storage party initiates the data authorization request including to-be-audited information to the entrusted signer, where the to-be-audited information may be information provided for the entrusted signer to audit the data user and may include, but is not limited to, at least one of identification information of the to-be-used data, data user information, data use and a signature of the data owner. The entrusted signer audits the data user based on the to-be-audited information, and the specific audit manner has been described in the above embodiments and will not be repeated herein. If the audit passes, the entrusted signer generates a signature result based on a preset rule and feeds the signature result back to the access control layer of the data storage party.

Optionally, if the to-be-used data in this embodiment includes data of multiple data owners, the access control layer of the data storage party initiates a data authorization request to the entrusted signer of each data owner and acquires a signature result fed back by each entrusted signer after each entrusted signer audits the data user in response to the data authorization request received by each entrusted signer itself. That is, for each data owner, the signature result fed back by the entrusted signer corresponding to each data owner is acquired. Accordingly, all the to-be-used data may be fed back only after the signature results of all entrusted signers pass the audit and verification of the signature verification keys of all entrusted signers; and if not all signature results of the entrusted signers pass the audit and verification of the signature verification keys of all entrusted signers, all the to-be-used data is not be fed back, or only the part of the to-be-used data of the data owners corresponding to the entrusted signers that have passed the audit and verification is fed back.

In S203, a lease smart contract is called according to the data usage request to determine a signature verification key of the entrusted signer associated with the to-be-used data.

In S204, verification on the signature result is performed according to the signature verification key.

In S205, if the verification passes, the to-be-used data is fed back to the data user.

In the technical solution of this embodiment, in response to the data usage request of the data user, the data storage party calls the lease smart contract to determine the entrusted signer associated with the to-be-used data, initiates the data authorization request to the entrusted signer, acquires the signature result fed back by the entrusted signer after the entrusted signer audits the data user, calls the lease smart contract to determine the signature verification key of the entrusted signer, performs verification on the signature result according to the signature verification key, and if the verification passes, feeds back the to-be-used data to the data user. In this solution, the data storage party interacts with the entrusted signer to acquire the signature result fed back by the entrusted signer without requiring the data user to determine and feed back the signature result. That is, the data user only needs to conventionally initiate a data usage request including the identification information of the to-be-used data, and then the data storage party can complete the audit of the data user, that is, the data storage party can complete the audit of the data user without the knowledge of the data user.

It is to be noted that the data user in this embodiment may be any party that wants to use the data stored by the data storage party, and although all data users belong to data users, the identities of different data users may be different, for example, the identity of some may be the data owner of the to-be-used data, the identity of some may be the direct user having the direct data usage demand, and the identity of some may be the proxy computing party having the indirect data usage demand Optionally, in this embodiment, the process where the data storage party initiates the data authorization request to the entrusted signer may include: to-be-audited information is determined according to the identity information of the data user; and the data authorization request including the to-be-audited information is initiated to the entrusted signer. Specifically, in this embodiment, according to the identity information of different data users, a data authorization request including different types of to-be-audited information may be initiated to the entrusted signer based on an association strategy between the identity information and the to-be-audited information. For example, if the identity information of the data user is the data owner, the to-be-audited information may be the signature of the data owner; and if the identity information of the data user is the proxy computing party, the to-be-audited information may be the information of the direct user that entrusts the proxy computing party, the data use and the like. The advantage of such a setting is that the entrusted signer adopts different strategies to audit based on data users with different identities, thereby improving the flexibility and diversity of the audit process of the data users with different identities.

On the basis of the embodiments described above, the entrusted signer and the signature result thereof are further defined, that is, the entrusted signer includes at least two participants of at least one level, and the signature result is the threshold signature results of the at least two participants.

Each participant in the entrusted signer may be regarded as a node, that is, the entrusted signer is composed of multiple participant nodes. In this embodiment, each of the multiple participant nodes belongs to one or more levels. The multiple participant nodes correspond to at least one level, the ranks of the at least one level decrease progressively, and the low-level node includes an adjacent high-level participant node.

For example, if multiple participants are in an administrative relationship, the multiple participants may be divided into two levels according to administrative ranks: supervisor level and employee level. Some nodes belong to the employee level, some may belong to both the supervisor level and the employee level, and the rank of the employee level is lower than the rank of the supervisor level according to administrative ranks. The level of each node may be determined based on the highest level to which each node belongs. For example, if the highest level to which a supervisor-level node belongs, the supervisor-level node also belongs to the employee level that is lower. This indicates that a high-level node may be backwards compatible with low-level nodes and is capable of knowing the information of low-level nodes, for example, the high-level node may know which node is an employee-level node, while the low-level node cannot know which node is a high-level node. Nodes at the same level are capable of knowing the highest levels to which they belong. The lower-level nodes should include all adjacent high-level nodes, and the higher the rank of the level, the smaller the number of corresponding nodes.

In this embodiment, at least two participants of at least one level may generate one joint threshold signature result based on the threshold signature technology. The specific generation process includes the following steps (1) and (2).

(1) Each participant needs to generate an asymmetric key pair based on the following steps A, B and C In A, for each level to which native nodes belong, one byte array or number is generated based on a random number according to a set generation algorithm as a first local secret; or for each level to which native nodes belong, one byte array or number is generated based on a mnemonic word set by a user according to a set recovery algorithm as the first local secret.

In B, each level is taken as a current level, and the first local secret of the current level is segmented into secret fragments according to the number of nodes in the current level and a set threshold signature threshold of the current level; each secret fragment of the current level is transmitted to each node in the current level according to the node numbers of the multi-party node and the fragment numbers determined when the secret fragments are segmented; where the set threshold signature threshold is a lower limit value of the number of nodes that need to participate in the threshold signature at the current level, and the node number recorded in each node is the same as the correspondence of nodes.

In C, the secret fragments segmented from and transmitted by other nodes of the current level are acquired, each level is taken as the current level, and the acquired secret fragments of each node of the current level are accumulated as a second local secret of the current level; the second local secret of the current level is converted into a set precision integer; and the set precision integer is converted into a private key on the set elliptic curve based on a set elliptic curve as a private key of the asymmetric key pair of the current level. Each level is taken as the current level, a level verification value of the current level is generated according to the first local secret of the current level, and the level verification value of each level is accumulated to generate a node verification value; the node verification value is transmitted to each node in the multi-party node; and node verification values generated and transmitted by other nodes in the multi-party node are acquired, and a public key of the asymmetric key pair is generated based on a base point of the set elliptic curve according to the acquired node verification values of the multi-party node.

(2) The multi-participant performs the multi-threshold signature based on the asymmetric key generated by the multi-participant according to the following steps A, B and C.

In A, the to-be-audited information is signed using the private key of each level of the native node separately to generate level key parameter fragments, the level key parameter fragments are accumulated to generate key parameter fragments, and the key parameter fragments are transmitted to other nodes in the multi-party node.

In B, a key parameter generated according to the key parameter fragments of each node is acquired.

In C, the threshold signature result of the to-be-audited information is encapsulated and formed according to the key parameter.

Optionally, in this embodiment, each level may be configured with a respective threshold signature threshold, and threshold signature thresholds are combined as a condition for limiting the threshold signature. The threshold signature threshold is set as the lower limit value of the number of nodes that need to participate in the threshold signature. If the number of nodes participating in the signature is less than a set threshold signature threshold, valid verification on the threshold signature cannot be performed.

In this embodiment, at least two participants of at least one level generate the threshold signature result based on the distributed key manage system (DKMS). As long as the threshold number requirement is satisfied, the signature of the to-be-audited information can be completed, and not all nodes are required to participate in the signature, thereby reducing the computation workload of the blockchain and lowering the cost. In addition, the key parameter is generated according to the acquired key parameter fragments by exchanging key parameter fragments, and then the signature is generated according to the key parameter. In this manner, the distributed key parameter is generated without relying on the central nodes, thereby improving the security of the signature.

Figure 3:
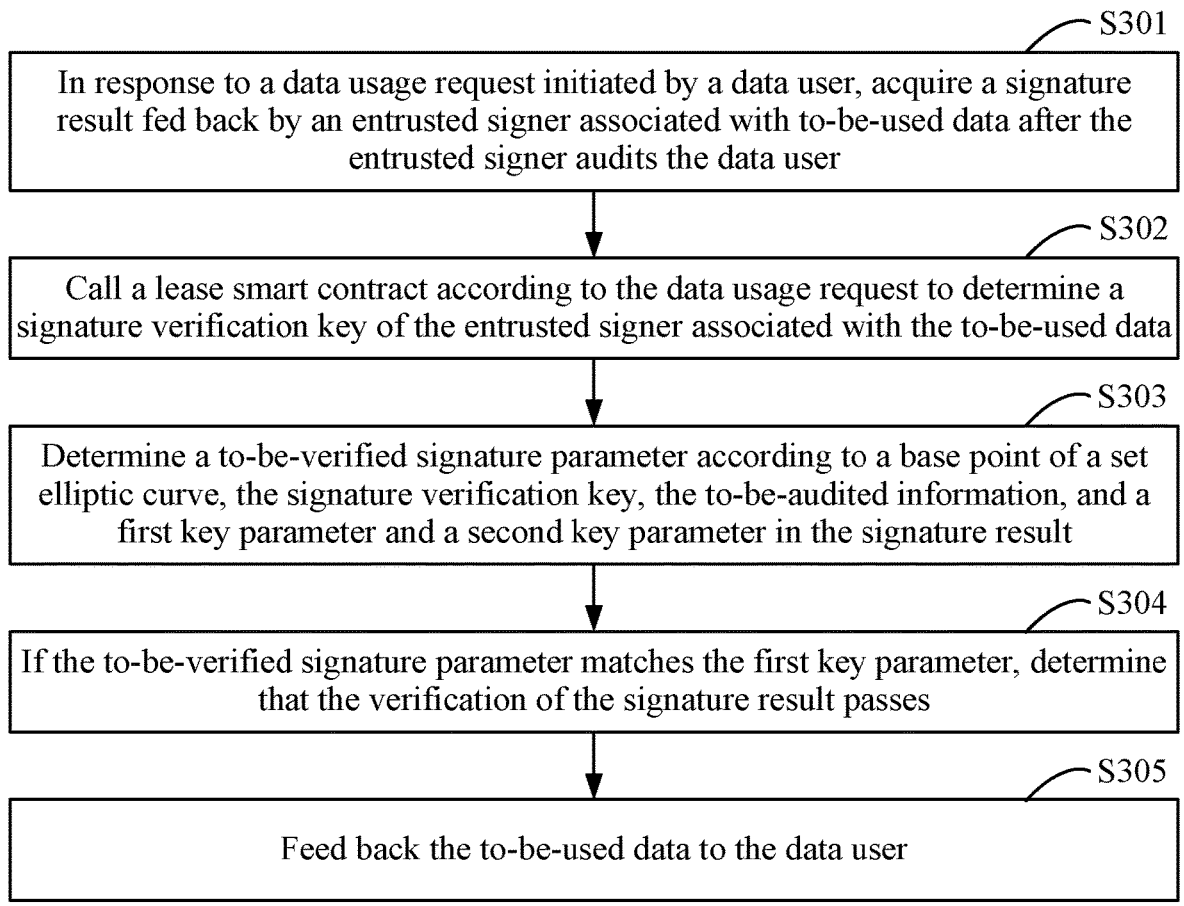
FIG. 3 is a flowchart of another blockchain-based data processing method according to an embodiment of the present disclosure.

Further, on the premise that the entrusted signer includes at least two participants of at least one level and the signature result is the threshold signature results of the at least two participants, the process where the verification is performed on the signature result according to the signature verification key is described in detail below. As shown in FIG. 3, the blockchain-based data processing method provided by this embodiment may include the steps described below.

In S301, in response to a data usage request initiated by a data user, a signature result fed back by an entrusted signer associated with to-be-used data after the entrusted signer audits the data user is acquired.

In S302, a lease smart contract is called according to the data usage request to determine a signature verification key of the entrusted signer associated with the to-be-used data.

In S303, a to-be-verified signature parameter is determined according to a base point of a set elliptic curve, the signature verification key, the to-be-audited information, and a first key parameter and a second key parameter in the signature result.

Both the first key parameter and the second key parameter belong to the key parameter in the signature result, and the specific determination process of the key parameter has been described in the embodiments described above and will not be repeated herein.

Optionally, in the embodiment, the to-be-verified signature parameter may be calculated based on the following formula:

$$Rv = SG - eC.$$

In the formula, Rv is the to-be-verified signature parameter, S is the second key parameter in the signature result, G is the base point of the set elliptic curve, C is the signature verification key, e equals to HASH (C, R, M), R is the first key parameter in the signature result, and M is the to-be-audited information.

In S304, if the to-be-verified signature parameter matches the first key parameter, the verification of the signature result passes.

Optionally, if the to-be-verified signature parameter Rv matches the first key parameter R, the verification of the signature result passes. For example, if Rv==R, the to-be-verified signature parameter matches the first key parameter. In this embodiment, the verification of the signature result is completed according to the first key parameter and the second key parameter generated in the process of threshold signature based on the key, thereby ensuring the security and credibility of the verification process.

It is to be noted that since the first key parameter is generated in the key-based threshold signature method provided by the embodiments of the present disclosure, if the to-be-verified signature parameter matches the first key parameter, the verification of the signature result passes, indicating that the audit of the data user passes; and if the to-be-verified signature parameter does not match the first key parameter, the verification of the signature result fails, indicating that the audit of the data user does not pass.

In S305, the to-be-used data is fed back to the data user.

Specifically, in a case where the audit in S304 passes, the to-be-used data is fed back to the data user.

In the technical solution of this embodiment, in a case where the entrusted signer includes at least two participants of at least one level and the signature result is the threshold signature results of the at least two participants, in response to the data usage request of the data user, the data storage party acquires the threshold signature result fed back by the entrusted signer associated with to-be-used data after the entrusted signer audits the data user, calls the lease smart contract to determine the signature verification key of the entrusted signer, performs verification on the threshold signature result using the signature verification key according to the to-be-audited information and the threshold signature result, and if the verification passes, feeds back the to-be-used data to the data user. In the process of the verification, the nodes that participated in the signature cannot be known, so there is certain anonymity, thereby effectively ensuring the security and credibility of the audit and verification process of the data user.

Figure 4:
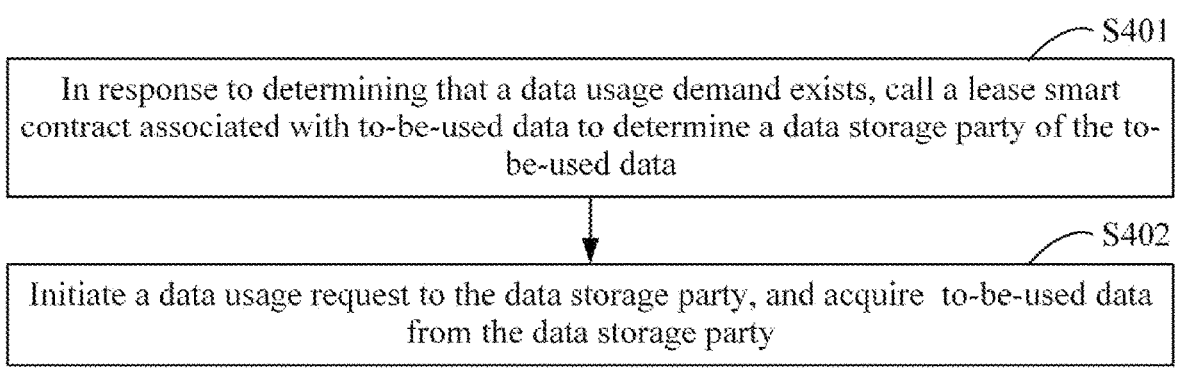
FIG. 4 is a flowchart of another blockchain-based data processing method according to an embodiment of the present disclosure.

FIG. 4 is a flowchart of another blockchain-based data processing method according to an embodiment of the present disclosure. This embodiment of the present disclosure is applicable to the scenario of safely using the data stored by a data storage party based on the blockchain technology. The entire blockchain-based data processing method is performed by the cooperation of a data user, a data storage party and an entrusted signer. The blockchain-based data processing method in this embodiment may be performed by a blockchain-based data processing apparatus. The apparatus may be implemented by software and/or hardware and may be integrated into a computing device carrying the data user. As shown in FIG. 4, the blockchain-based data processing method provided by this embodiment may include the steps described below.

In S401, in response to determining that a data usage demand exists, a lease smart contract associated with to-be-used data is called to determine a data storage party of the to-be-used data.

Optionally, since the lease smart contract records the information of participants of a data storage transaction, that is, the information of the data storage party and the data owner, the lease smart contract associated with the to-be-used data is called so as to acquire the data storage party of the to-be-used data from the lease smart contract. That is, when the data user has a data usage demand, the data user needs to call the lease smart contract of the storage transaction to which the to-be-used data belongs from the blockchain network, and execute the relevant logic of acquiring the data storage party to obtain the data storage party of the to-be-used data, for example, the identification information of the data storage party is obtained.

Preferably, the data storage party may look up a lease smart contract associated with the identification information in the blockchain network according to the identification information of the to-be-used data; the lease smart contract is called to determine the data storage party of the to-be-used data. Specifically, if the data user wants to acquire the data, the data user at least knows the identification information of the to-be-used data so that the data user may look up from the blockchain network the lease smart contract of the storage transaction where the identification information of the to-be-used data is recorded, call the lease smart contract, and execute the relevant logic of acquiring the data storage party, so as to obtain the data storage party of the to-be-used data. The data storage party can be accurately located according to the data information of the to-be-used data, thereby improving the flexibility and convenience of the determination of the data storage party.

Optionally, if the data user is the data owner of the to-be-used data, since the data owner participates in the storage transaction of the to-be-used data, the lease smart contract of the storage transaction may be stored locally, and at this point, the data user may also locally acquire the lease smart contract of the storage transaction to which the to-be-used data belongs.

It is to be noted that if the to-be-used data is the data of one data owner and the data owner stores the to-be-used data in multiple different data storage parties, the data user may call the lease smart contract associated with the to-be-used data to determine the multiple data storage parties of the to-be-used data. If the to-be-used data is the data of multiple data owners and the data of each data owner is stored in at least one data storage party, the data user may call the lease smart contract associated with the to-be-used data of each data owner to determine at least one data storage party corresponding to the to-be-used data of each data owner.

In S402, a data usage request is initiated to the data storage party, and to-be-used data fed back by the data storage party is acquired.

The data usage request is used for instructing the data storage party to perform verification on the signature result provided by the entrusted signer, and in a case where the verification passes, feed back the to-be-used data. It is to be noted that the process of how the data storage party responds to the data usage request has been described in detail in the embodiments described above and will not be repeated herein.

Optionally, in this embodiment, the lease smart contract associated with the to-be-used data may be called according to the identification information of the to-be-used data and the identification information of the data user itself, the relevant logic codes for initiating the data usage request may be executed, a data usage request may be initiated, and the data usage request may be sent to the data storage party. After the data storage party receives the data usage request, the data storage party may acquire a signature result fed back by the entrusted signer associated with the to-be-used data after the entrusted signer audits the data user; call the lease smart contract according to the data usage request to determine a signature verification key of the entrusted signer associated with the to-be-used data; performs verification on the signature result according to the signature verification key; and if the verification passes, feed back the to-be-used data to the data user. Accordingly, the data user may acquire the to-be-used data fed back by the data storage party.

It is to be noted that if it is determined in S401 that the to-be-used data is stored by multiple data storage parties, in this embodiment, one data usage request may be initiated to each data storage party based on the identification information of the to-be-used data stored by each data storage party and the identification information of the data user itself. That is, one separate data usage request is initiated to each data storage party.

In the technical solution of this embodiment, when the data user has a data usage demand, the lease smart contract associated with the to-be-used data may be called to determine the data storage party of the to-be-used data, and the data usage request may be initiated to the data storage party so that the data storage party acquires the signature result fed back by the entrusted signer associated with the to-be-used data after the entrusted signer audits the data user and the signature verification key of the entrusted signer according to the data usage request, performs verification on the signature result based on the signature verification key, and after the verification passes, feeds back the to-be-used data to the data user. In this solution, for any data user, if the data user wants to acquire the data from the data storage party, the data user needs to pass the audit of the entrusted signer of the data owner to which the to-be-used data belongs, and the signature result fed back by the entrusted signer after the entrusted signer audits the data user also needs to pass the verification. Even the data owner cannot use the data stored in the data storage arbitrarily. Therefore, the usage security of the data stored by the data storage party is greatly improved.

Figure 5:
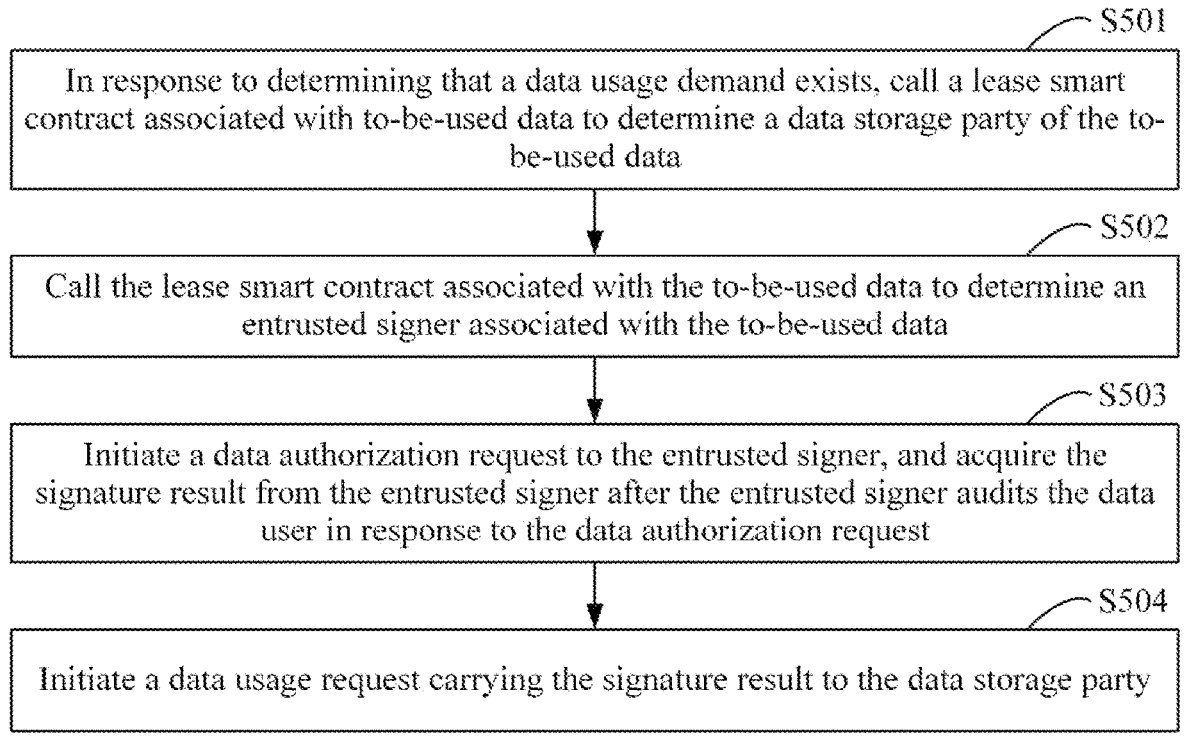
FIG. 5 is a flowchart of another blockchain-based data processing method according to an embodiment of the present disclosure.

FIG. 5 is a flowchart of another blockchain-based data processing method according to an embodiment of the present disclosure. On the basis of the embodiments described above, the process where the data usage request is initiated to the data storage party is described in detail below. As shown in FIG. 5, the blockchain-based data processing method provided by this embodiment may include the steps described below.

In S501, in response to determining that a data usage demand exists, a lease smart contract associated with to-be-used data is called to determine a data storage party of the to-be-used data.

In S502, the lease smart contract associated with the to-be-used data is called to determine an entrusted signer associated with the to-be-used data.

Optionally, in this embodiment, the process where the data user calls the lease smart contract associated with the to-be-used data and determines the entrusted signer associated with the to-be-used data is similar to the process where the data storage party calls the lease smart contract and determines the entrusted signer associated with the to-be-used data in the embodiments described above. For example, the data user may look up a lease smart contract of a storage transaction to which the to-be-used data belongs from the lease smart contracts of many storage transactions in the blockchain network based on the identification information of the to-be-used data, then call the lease smart contract, and execute the relevant logic of acquiring the entrusted signer, so as to obtain the entrusted signer associated with the to-be-used data.

It is to be noted that if the to-be-used data in this embodiment includes data of multiple data owners, each data owner needs to determine the corresponding entrusted signer based on the method described above.

In S503, a data authorization request is initiated to the entrusted signer, and the signature result fed back by the entrusted signer after the entrusted signer audits the data user in response to the data authorization request is acquired.

Optionally, the process where the data user initiates the data authorization request to the entrusted signer and acquires the signature result fed back by the entrusted signer after the entrusted signer audits the data user in response to the data authorization request is similar to the process where the data storage party initiates the data authorization request to the entrusted signer and acquires the signature result fed back by the entrusted signer after the entrusted signer audits the data user in response to the data authorization request in the embodiments described above. For example, the data user may initiate a data authorization request including to-be-audited information to the entrusted signer, where the to-be-audited information may be the information provided for the entrusted signer to audit the to-be-audited information and may include, but is not limited to, at least one of identification information of the to-be-used data, data user information, data use and a signature of the data owner. The entrusted signer generates a signature result based on the to-be-audited information after the audit passes and feeds back the signature result.

It is to be noted that if the to-be-used data in this embodiment includes data of multiple data owners, the data user may initiate one data authorization request to the entrusted signer of each data owner and acquire the signature result fed back by each entrusted signer after each entrusted signer audits the data user itself in response to the received data authorization request.

Optionally, the entrusted signer includes at least two participants of at least one level, and the signature result is the threshold signature results of the at least two participants. In this embodiment, at least two participants of at least one level generate the threshold signature result based on the distributed key manage system (DKMS). The advantage of such a setting is that as long as the threshold number requirement is satisfied, the signature of the to-be-audited information can be completed, and not all nodes are required to participate in the signature, thereby reducing the computation workload of the blockchain and lowering the cost. In addition, the key parameter is generated according to the acquired key parameter fragments by exchanging key parameter fragments, and then the signature is generated according to the key parameter. In this manner, the distributed key parameter is generated without relying on the central nodes, thereby improving the security of the signature.

In S504, a data usage request carrying the signature result is initiated to the data storage party.

Optionally, in this embodiment, when the data user initiates the data usage request to the data storage party, the data user may carry the acquired signature result fed back by the entrusted signer in the data usage request so that the data storage party may quickly complete the audit of the access authority of the data user based on the signature result, so as to quickly feed back the to-be-used data.

In the technical solution of this embodiment, when the data user has a data usage demand, the data user calls the lease smart contract associated with the to-be-used data to determine the data storage party and the entrusted signer of the to-be-used data, then initiate the data authorization request to the entrusted signer, acquires the signature result fed back by the entrusted signer, and adds the acquired signature result to the data usage request initiated to the data storage party so that the data storage party performs verification on the signature result based on the signature verification key according to the signature result carried in the data usage request and the signature verification key of the entrusted signer and feeds back the to-be-used data to the data user. In this solution, the data user initiates the data authorization request to the entrusted signer, and the data user directly carries the signature result in the data usage request and sends the signature result to the data storage party, thereby improving the efficiency of the data storage party to acquire the signature result and further improving the efficiency of the data storage party to perform verification on the access authority of the data user, so as to quickly acquiring of the to-be-used data.

Optionally, in this embodiment, since the data user may be any party that wants to use the data stored by the data storage party, different data users may correspond to different identities, for example, the identity of some may be the data owner of the to-be-used data, the identity of some may be the direct user having the direct data usage demand, and the identity of some may be the proxy computing party having the indirect data usage demand Therefore, in this embodiment, the process where the data user initiates the data authorization request to the entrusted signer may include: to-be-audited information is determined according to local identity information, and the data authorization request including the to-be-audited information is initiated to the entrusted signer. Specifically, in combination with the identity information of the data user itself, the data user may initiate the data authorization request including different types of to-be-audited information to the entrusted signer based on an association strategy between the identity information and the to-be-audited information. For example, if the data user is the data owner, the to-be-audited information may be the signature of the data owner, that is, the signature information of the data owner; and if the data user is the proxy computing party, the to-be-audited information may be the information of the direct user that entrusts the proxy computing party to compute, the data use and the like. The advantage of such a setting is that the entrusted signer adopts different strategies to audit based on data users with different identities, thereby improving the flexibility and diversity of the audit process of the data users with different identities.

Figure 6:
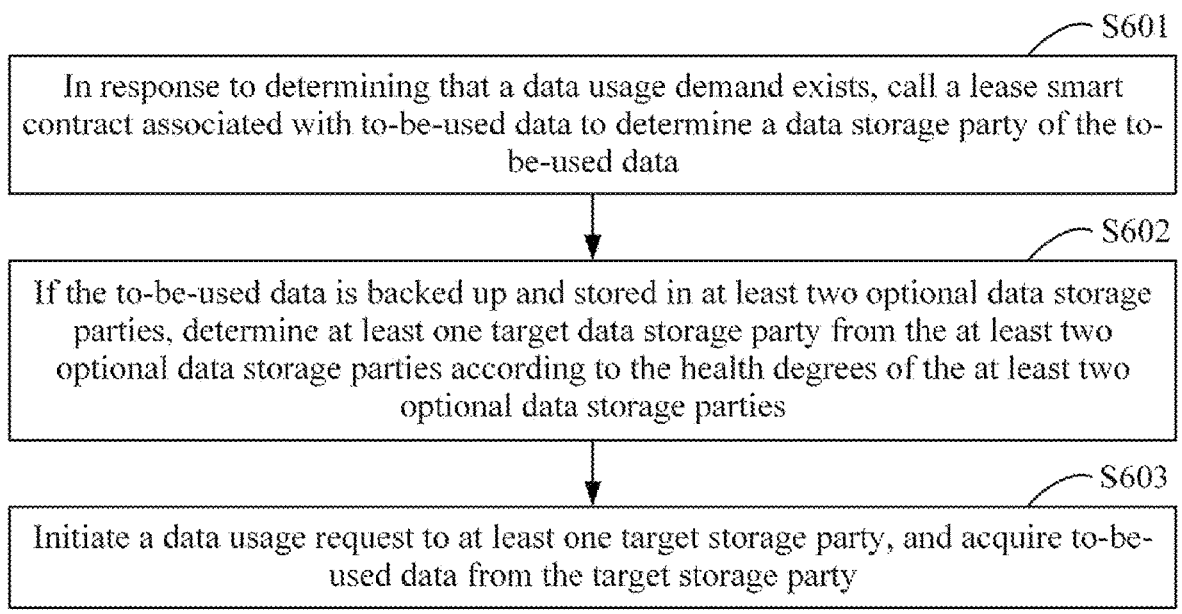
FIG. 6 is a flowchart of another blockchain-based data processing method according to an embodiment of the present disclosure.

FIG. 6 is a flowchart of another blockchain-based data processing method according to an embodiment of the present disclosure. On the basis of the embodiments described above, the process where the data usage request is initiated to the data storage party is described in detail below. As shown in FIG. 6, the blockchain-based data processing method provided by this embodiment may include the steps described below.

In S601, in response to determining that a data usage demand exists, a lease smart contract associated with to-be-used data is called to determine a data storage party of the to-be-used data.

It is to be noted that when the data owner stores its data, in order to ensure the security of the data, the data owner may back up and store the data in multiple different data storage parties, and at this point, when the data user uses the data, the data user may determine multiple data storage parties storing the to-be-used data based on the lease smart contract, and these data storage parties are referred to as optional data storage parties.

In S602, if the to-be-used data is backed up and stored in at least two optional data storage parties, at least one target data storage party is determined from the at least two optional data storage parties according to the health degrees of the at least two optional data storage parties.

The health degree may be an index used for characterizing the stability of the data storage party. Optional, the health degree may be presented in the form of scores; or the health degree may be presented in other forms such as categories. For example, according to the order of the health degree from high to low, the health degree may be divided into three grades: red, yellow and green. Optionally, the health degree of the data storage party may be determined by calling the lease smart contract according to the historical task completion and/or historical heartbeat of the data storage party.

Optionally, in this embodiment, if the to-be-used data is backed up and stored in at least two optional data storage parties, since multiple optional storage parties repeatedly store the to-be-used data, there is no need to repeatedly acquire the to-be-used data from the multiple data storage parties. Therefore, a part of target storage parties may be screened out from each optional data storage party based on the health degree of each optional storage party to acquire the to-be-used data from the target storage parties. Specifically, there may be various strategies for screening the target storage parties from the optional data storage parties, and this embodiment is not limited thereto.

In one embodiment, optional data storage parties are categorized, for example, target storage parties storing the same to-be-used data are categorized into one category; and for each category, one optional storage party with the highest health degree is selected to form the target storage parties.

In another embodiment, at least one set of storage parties that can cover all the to-be-used data is selected based on the data quantity of the to-be-used data stored by each optional storage party; in combination with the health degrees and the number of optional storage parties in each storage party set, one storage party set with high health degree and having a small number of storage parties is selected, and optional data storage parties in the selected storage party set are taken as the target storage parties.

In S603, a data usage request is initiated to at least one target storage party, and to-be-used data fed back by the target storage party is acquired.

Specifically, in this example, the data usage request is only initiated to the screened target storage parties, and the to-be-used data fed back by the target storage parties is acquired.

In the technical solution of this embodiment, when the data user has the data usage demand and the to-be-used data is backed up and stored in at least two optional data storage parties, the lease smart contract associated with the to-be-used data is called, multiple optional data storage parties of the to-be-used data are determined, at least one target data storage party is selected from the multiple optional data storage parties according to the health degrees of the multiple optional storage parties, the data usage request is initiated to the at least one target data storage party, and the to-be-used data fed back by the at least one target data storage party is acquired. In this embodiment, when the to-be-used data is backed up and stored in at least two optional data storage parties, there is no need to repeatedly acquire the to-be-used data, thereby avoiding the waste of resources. In addition, in this embodiment, the health degrees of the data storage parties are used to select the target data storage party, and since the performance of the data storage party with a high health degree is more stable, the security of the to-be-used data acquired in this embodiment is higher.

Figure 7:
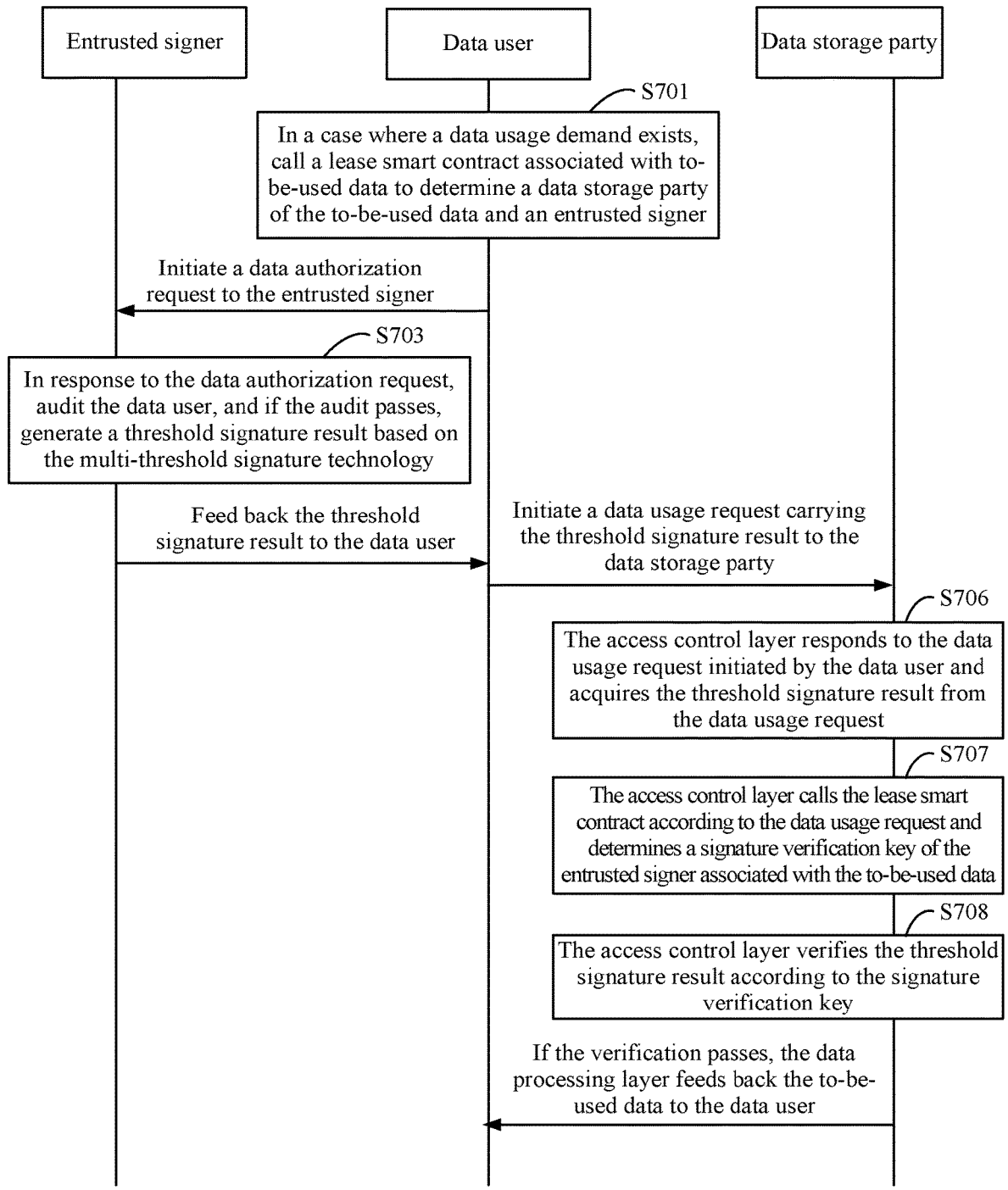
FIG. 7 is a signaling diagram of a blockchain-based data processing method according to an embodiment of the present disclosure.

FIG. 7 is a signaling diagram of a blockchain-based data processing method according to an embodiment of the present disclosure. On the basis of the embodiments described above, this embodiment provides a preferred embodiment in which a data user, a data storage party and an entrusted signer cooperate with each other to perform a data usage method. As shown in FIG. 7, the blockchain-based data processing method provided by this embodiment may include the steps described below.

In S701, in a case where a data user has a data usage demand, the data user calls a lease smart contract associated with to-be-used data to determine a data storage party of the to-be-used data and an entrusted signer.

The entrusted signer includes at least two participants of at least one level.

In S702, the data user initiates a data authorization request to the entrusted signer.

In S703, the entrusted signer responds to the data authorization request to audit the data user, if the audit passes, the entrusted signer generates a threshold signature result based on the multi-threshold signature technology, and feeds back the threshold signature result to the data user.

In S704, the data user acquires the threshold signature result fed back by the entrusted signer.

In S705, the data user initiates a data usage request carrying the threshold signature result to the data storage party.

In S706, the access control layer of the data storage party responds to the data usage request initiated by the data user and acquires the threshold signature result from the data usage request.

In S707, the access control layer of the data storage party calls the lease smart contract according to the data usage request and determines a signature verification key of the entrusted signer associated with the to-be-used data.

In S708, the access control layer of the data storage party performs verification on the threshold signature result according to the signature verification key.

In S709, if the verification passes, the data processing layer of the data storage party feeds back the to-be-used data to the data user.

In S710, the data user acquires the to-be-used data fed back by the data storage party.

In this embodiment, a preferred embodiment in which the data user, the data storage party and the entrusted signer cooperate with each other to perform a data usage method, thereby improving the usage security of the data.

Figure 8:
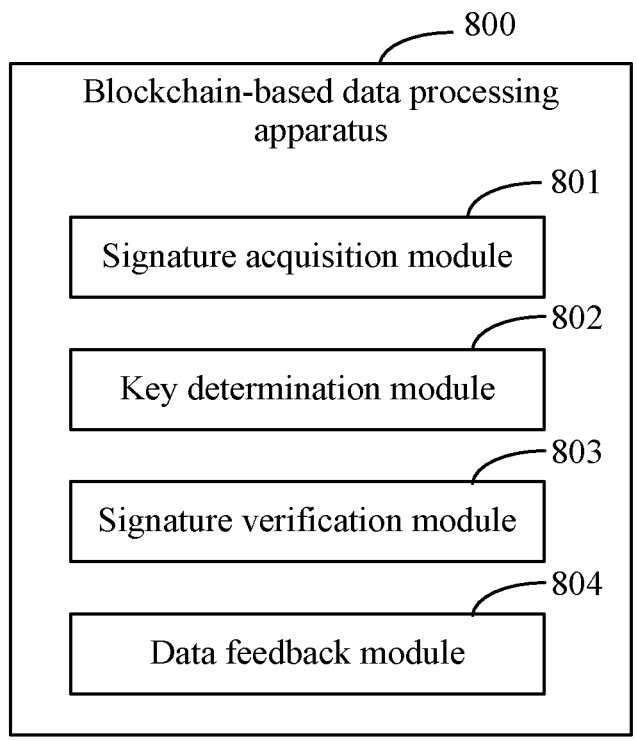
FIG. 8 is a structural diagram of a blockchain-based data processing apparatus according to an embodiment of the present disclosure.

FIG. 8 is a structural diagram of a blockchain-based data processing apparatus according to an embodiment of the present disclosure. The apparatus can implement the blockchain-based data processing method described in the embodiments of the present disclosure. The apparatus can be integrated into a computing device carrying the data storage party. The blockchain-based data processing apparatus 800 specifically includes a signature acquisition module 801, a key determination module 802, a signature verification module 803 and a data feedback module 804.

The signature acquisition module 801 is configured to, in response to a data usage request initiated by a data user, acquire a signature result fed back by an entrusted signer associated with to-be-used data after the entrusted signer audits the data user.

The key determination module 802 is configured to call a lease smart contract according to the data usage request to determine a signature verification key of the entrusted signer associated with the to-be-used data.

The signature verification module 803 is configured to perform verification on the signature result according to the signature verification key.

The data feedback module 804 is configured to, if the verification passes, feed back the to-be-used data to the data user.

In the technical solution of this embodiment, in response to the data usage request of the data user, the data storage party acquires the signature result fed back by the entrusted signer associated with the to-be-used data after the entrusted signer audits the data user, calls the lease smart contract to determine the signature verification key of the entrusted signer, performs verification on the signature result according to the signature verification key, and if the verification passes, feeds back the to-be-used data to the data user. In this solution, before the data storage party provides the to-be-used data for the data user, the data user needs to pass the audit of the entrusted signer of the data owner to which the to-be-used data belongs, and the signature result fed back by the entrusted signer after the entrusted signer audits the data user also needs to pass the verification. That is, the data user is approved by the entrusted signer (that is, the data owner) before the data user acquires the data of the data owner, thereby ensuring the usage security of the data in a case where the data owner stores its data in the data storage party.

Further, the signature acquisition module 801 is specifically configured to perform the operations described below.

The signature result fed back by the entrusted signer associated with the to-be-used data after the entrusted signer audits the data user is acquired from the data usage request initiated by the data user.

Further, the signature acquisition module 801 includes a first entrusted signer determination unit, a first authorization request initiation unit and a first signature result acquisition unit.

The first entrusted signer determination unit is configured to call the lease smart contract according to the data usage request initiated by the data user to determine the entrusted signer associated with the to-be-used data.

The first authorization request initiation unit is configured to initiate a data authorization request to the entrusted signer.

The first signature result acquisition unit is configured to acquire the signature result fed back by the entrusted signer after the entrusted signer audits the data user in response to the data authorization request.

Further, the first authorization request initiation unit is specifically configured to perform the operations described below.

To-be-audited information is determined according to identity information of the data user.

The data authorization request including the to-be-audited information is initiated to the entrusted signer.

Further, the key determination module 802 is specifically configured to perform the operations described below.

Identification information of the to-be-used data is determined according to the data usage request.

A lease smart contract associated with the identification information is looked up in a blockchain network, the lease smart contract is called, and the signature verification key of the entrusted signer associated with the to-be-used data is determined.

Further, the entrusted signer includes at least two participants of at least one level, and the signature result is the threshold signature results of the at least two participants.

Further, the signature verification module 803 is specifically configured to perform the operations described below.

A to-be-verified signature parameter is determined according to a base point of a set elliptic curve, the signature verification key, the to-be-audited information, and a first key parameter and a second key parameter in the signature result.

If the to-be-verified signature parameter matches the first key parameter, the verification of the signature result passes.

Figure 9:
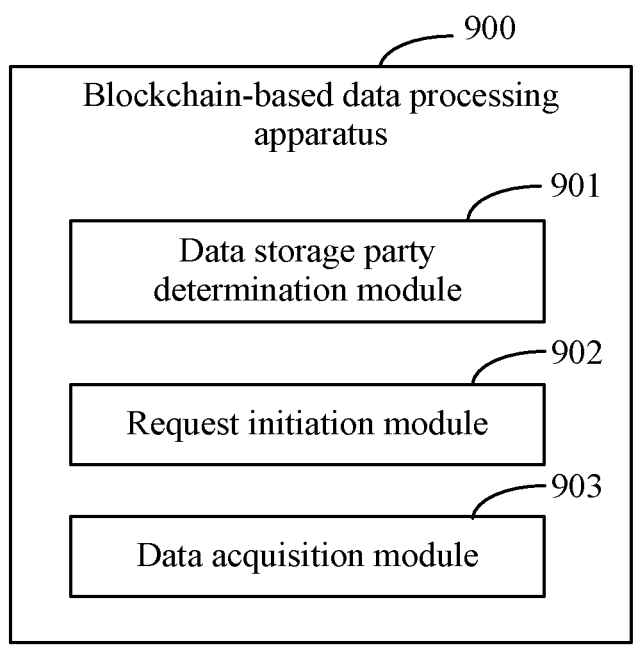
FIG. 9 is a structural diagram of another blockchain-based data processing apparatus according to an embodiment of the present disclosure.

FIG. 9 is a structural diagram of another blockchain-based data processing apparatus according to an embodiment of the present disclosure. The apparatus can implement the blockchain-based data processing method described in the embodiments of the present disclosure. The apparatus can be integrated into a computing device carrying the data user. The blockchain-based data processing apparatus 900 specifically includes a data storage party determination module 901, a request initiation module 902 and a data acquisition module 903.

The data storage party determination module 901 is configured to, in response to determining that a data usage demand exists, call a lease smart contract associated with to-be-used data to determine a data storage party of the to-be-used data.

The request initiation module 902 is configured to initiate a data usage request to the data storage party.

The data acquisition module 903 is configured to acquire to-be-used data fed back by the data storage party.

In the technical solution of this embodiment, when the data user has a data usage demand, the lease smart contract associated with the to-be-used data may be called to determine the data storage party of the to-be-used data, and the data usage request may be initiated to the data storage party so that the data storage party acquires the signature result fed back by the entrusted signer associated with the to-be-used data after the entrusted signer audits the data user and the signature verification key of the entrusted signer according to the data usage request, performs verification on the signature result based on the signature verification key, and after the verification passes, feeds back the to-be-used data to the data user. In this solution, for any data user, if the data user wants to acquire the data from the data storage party, the data user needs to pass the audit of the entrusted signer of the data owner to which the to-be-used data belongs, and the signature result fed back by the entrusted signer after the entrusted signer audits the data user also needs to pass the verification. Even the data owner cannot use the data stored in the data storage arbitrarily. Therefore, the usage security of the data stored by the data storage party is greatly improved.

Further, the request initiation module 902 further includes a second entrusted signer determination unit, a second authorization request initiation unit, a second signature result acquisition unit and a data usage request initiation unit.

The second entrusted signer determination unit is configured to call the lease smart contract associated with the to-be-used data to determine an entrusted signer associated with the to-be-used data.

The second authorization request initiation unit is configured to initiate a data authorization request to the entrusted signer.

The second signature result acquisition unit is configured to acquire the signature result fed back by the entrusted signer after the entrusted signer audits the data user in response to the data authorization request.

The data usage request initiation unit is configured to initiate the data usage request carrying the signature result to the data storage party.

Further, the second authorization request initiation unit is specifically configured to perform the operations described below.

To-be-audited information is determined according to local identity information.

The data authorization request including the to-be-audited information is initiated to the entrusted signer.

Further, the entrusted signer includes at least two participants of at least one level, and the signature result is the threshold signature results of the at least two participants.

Further, the request initiation module 902 is specifically configured to perform the operations described below.

If the to-be-used data is backed up and stored in at least two optional data storage parties, at least one target data storage party is determined from the at least two optional data storage parties according to the health degrees of the at least two optional data storage parties.

The data usage request is initiated to the at least one target storage party.

Further, the data storage party determination module 901 is specifically configured to perform the operations described below.

A lease smart contract associated with the identification information of the to-be-used data is looked up in a blockchain network according to the identification information.

The lease smart contract is called to determine the data storage party of the to-be-used data.

Further, the data usage request is used for instructing the data storage party to perform verification on the signature result provided by the entrusted signer, and in a case where the verification passes, feed back the to-be-used data.

The preceding products may perform the method provided by any embodiment of the present disclosure and has functional modules and beneficial effects corresponding to the performed method.

In the technical solutions of the present disclosure, acquisition, storage and application of the to-be-used data, historical task completion and historical heartbeat involved herein are in compliance with relevant laws and regulations and do not violate the public order and good customs.

According to an embodiment of the present disclosure, the present disclosure further provides an electronic device, a readable storage medium and a computer program product.

Figure 10:
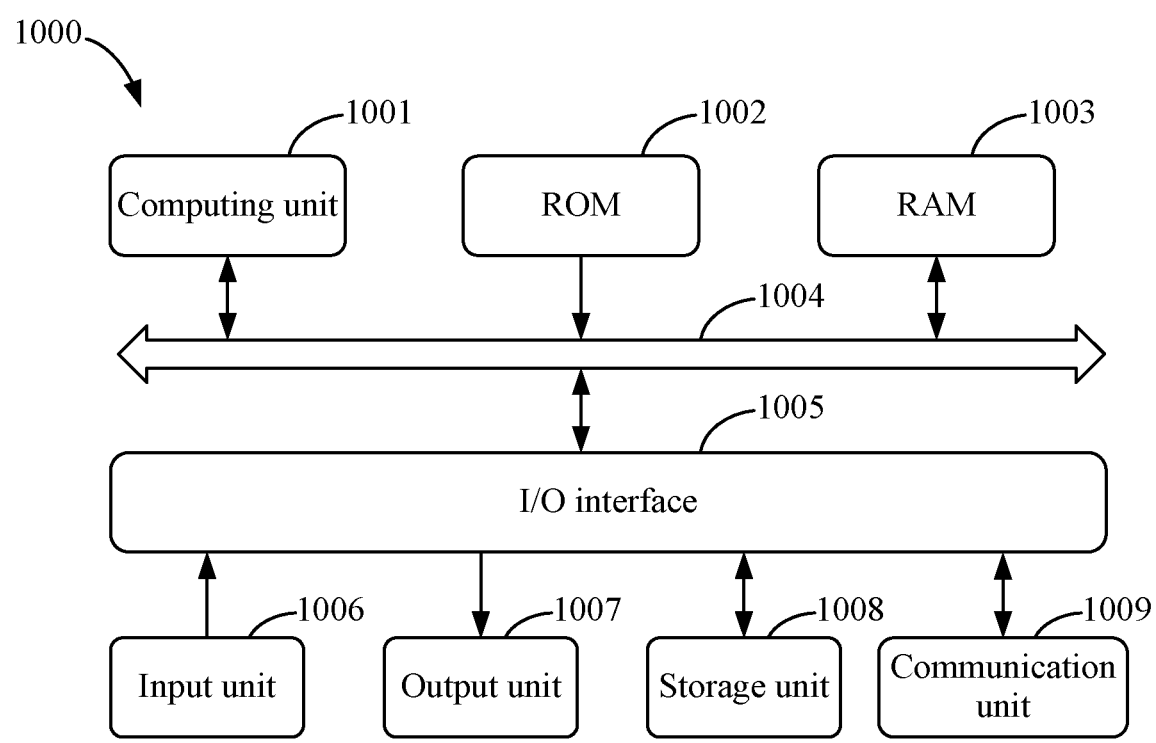
FIG. 10 is a block diagram of an electronic device for implementing the blockchain-based data processing method according to an embodiment of the present disclosure.

FIG. 10 is a block diagram of an electronic device 1000 for implementing the embodiments of the present disclosure. The electronic device is intended to represent various forms of a digital computer, for example, a laptop computer, a desktop computer, a worktable, a personal digital assistant, a server, a blade server, a mainframe computer or another applicable computer. The electronic device may also represent various forms of mobile device, for example, a personal digital assistant, a cellphone, a smartphone, a wearable device or another similar computing device. Herein the shown components, the connections and relationships between these components, and the functions of these components are illustrative only and are not intended to limit the implementation of the present disclosure as described and/or claimed herein.

As shown in FIG. 10, the device 1000 includes a computing unit 1001. The computing unit 1001 may perform various types of appropriate operations and processing based on a computer program stored in a read-only memory (ROM) 1002 or a computer program loaded from a storage unit 1008 to a random-access memory (RAM) 1003. Various programs and data required for operations of the device 1000 may also be stored in the RAM 1003. The computing unit 1001, the ROM 1002 and the RAM 1003 are connected to each other via a bus 1004. An input/output (I/O) interface 1005 is also connected to the bus 1004.

Multiple components in the device 1000 are connected to the I/O interface 1005. The multiple components include an input unit 1006 such as a keyboard and a mouse, an output unit 1007 such as various types of displays and speakers, the storage unit 1008 such as a magnetic disk and an optical disk, and a communication unit 1009 such as a network card, a modem and a wireless communication transceiver. The communication unit 1009 allows the device 1000 to exchange information/data with other devices over a computer network such as the Internet and/or various telecommunications networks.

The computing unit 1001 may be various general-purpose and/or special-purpose processing components having processing and computing capabilities. Some examples of the computing unit 1001 include, but are not limited to, central processing units (CPUs), graphics processing units (GPUs), various special-purpose artificial intelligence (AI) computing chips, various computing units running machine learning models and algorithms, digital signal processors (DSPs), and any suitable processors, controllers and microcontrollers. The computing unit 1001 executes various preceding methods and processing, such as the blockchain-based data processing method. For example, in some embodiments, the blockchain-based data processing method may be implemented as a computer software program tangibly contained in a machine-readable medium such as the storage unit 1008. In some embodiments, part or all of a computer program may be loaded and/or installed on the device 1000 via the ROM 1002 and/or the communication unit 1009. When the computer program is loaded to the RAM 1003 and executed by the computing unit 1001, one or more steps of the preceding blockchain-based data processing method may be executed. Alternatively, in other embodiments, the computing unit 1001 may be configured, in any other suitable manner (for example, by means of firmware), to execute the blockchain-based data processing method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on a chip (SoCs), complex programmable logic devices (CPLDs), computer hardware, firmware, software and/or combinations thereof. The embodiments may include implementations in one or more computer programs. The one or more computer programs are executable, interpretable, or executable and interpretable on a programmable system including at least one programmable processor. The programmable processor may be a dedicated or general-purpose programmable processor for receiving data and instructions from a memory system, at least one input device and at least one output device and transmitting the data and instructions to the memory system, the at least one input device and the at least one output device.

Program codes for implementing the methods of the present disclosure may be compiled in any combination of one or more programming languages. These program codes may be provided for a processor or controller of a general-purpose computer, a special-purpose computer or another programmable data processing device such that the program codes, when executed by the processor or controller, cause functions/operations specified in the flowcharts and/or block diagrams to be implemented. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or used in conjunction with a system, apparatus or device that executes instructions. The machine-readable medium may be a machine-readable signal medium or a machine-readable storage medium. The machine-readable medium may include, but are not limited to, electronic, magnetic, optical, electromagnetic, infrared or semiconductor systems, apparatuses or devices or any suitable combinations thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order to provide the interaction with a user, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of devices may also be used for providing interaction with a user. For example, feedback provided for the user can be sensory feedback in any form (for example, visual feedback, auditory feedback or haptic feedback). Moreover, input from the user can be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship with each other. The server may be a cloud server, also referred to as a cloud computing server or a cloud host. As a host product in a cloud computing service system, the server solves the defects of difficult management and weak service scalability in the service of a related physical host and a related virtual private server (VPS). The server may also be a server of a distributed system or a server combined with blockchain.

Artificial intelligence is the study of making computers simulate certain thinking processes and intelligent behaviors (such as learning, reasoning, thinking, planning, and the like) of humans, both at the hardware and software level. The artificial intelligence hardware technologies generally include technologies such as sensors, special artificial intelligence chips, cloud computing, distributed storage, big data processing, and the like. The artificial intelligence software technologies mainly include computer vision technology, speech recognition technology, natural language processing technology, machine learning/deep learning technology, big data processing technology, knowledge map technology, and the like.

Cloud computing refers to a technical system that accesses flexible and scalable shared physical or virtual resource pools through the network, where resources can include servers, operating systems, networks, software, applications and storage devices, and deploys and manages resources as required and in a self-service manner. The cloud computing technology can provide efficient and powerful data processing capabilities for artificial intelligence, blockchain and other technology applications and model training.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure is within the scope of the present disclosure.

What is claimed is:

1. A blockchain-based data processing method, applied to a data storage party, comprising:
 in response to a data usage request initiated by a data user, acquiring a signature result fed back by an entrusted signer after the entrusted signer audits the data user according to to-be-audited information of the data user, wherein the entrusted signer is a signer of a data owner associated with to-be-used data and the to-be-audited information is determined according to identity information of the data user and an association strategy between the identity information and the to-be-audited information;

wherein the entrusted signer comprises at least two participants of at least one level, and the signature result is a threshold signature result of the at least two participants;

calling a lease smart contract according to the data usage request to determine a signature verification key of the entrusted signer;

performing verification on the signature result according to the signature verification key;

wherein performing the verification on the signature result according to the signature verification key comprises:
 determining a to-be-verified signature parameter according to a base point of a set elliptic curve, the signature verification key, to-be-audited information, and a first key parameter and a second key parameter in the signature result; and
 in a case where the to-be-verified signature parameter matches the first key parameter, determining that the verification of the signature result passes; and in a case where the verification passes, feeding back the to-be-used data to the data user, wherein a computing device of the data storage party comprises at least one of an access control layer or a data processing layer, and wherein the data processing layer is used for providing data for the data user, and the access control layer is located before the data processing layer and is used for performing verification on an access authority of the data user before providing the data for the data user.

2. The method according to claim 1, wherein in response to the data usage request initiated by the data user, acquiring the signature result fed back by the entrusted signer after the entrusted signer audits the data user according to the to-be-audited information of the data user comprises:
 acquiring, from the data usage request initiated by the data user, the signature result fed back by the entrusted signer after the entrusted signer audits the data user according to the to-be-audited information of the data user.

3. The method according to claim 1, wherein in response to the data usage request initiated by the data user, acquiring the signature result fed back by the entrusted signer after the entrusted signer audits the data user according to the to-be-audited information of the data user comprises:
 calling the lease smart contract according to the data usage request to determine the entrusted signer of the data owner associated with the to-be-used data; and
 initiating a data authorization request comprising the to-be-audited information of the data user to the entrusted signer, and acquiring the signature result fed back by the entrusted signer after the entrusted signer audits the data user according to the to-be-audited information of the data user.

4. The method according to claim 1, wherein calling the lease smart contract according to the data usage request to determine the signature verification key of the entrusted signer comprises:
 determining identification information of the to-be-used data according to the data usage request; and
 looking up a lease smart contract associated with the identification information in a blockchain network, calling the lease smart contract, and determining the signature verification key of the entrusted signer.

5. A blockchain-based data processing method, applied to a data user, comprising:
 in response to determining that a data usage demand exists, calling a lease smart contract associated with to-be-used data to determine a data storage party of the to-be-used data; and
 initiating a data usage request to the data storage party, and acquiring to-be-used data from the data storage party,
 wherein the data usage request is used for indicating the data storage party to perform verification on a signature result fed back by an entrusted signer after the entrusted signer audits the data user according to to-be-audited information of the data user and feedback the to-be-used data in a case where the verification passes, the entrusted signer is a signer of a data owner associated with to-be-used data, wherein the entrusted signer comprises at least two participants of at least one level, and the signature result is a threshold signature result of the at least two participants, and the to-be-audited information is determined according to identity information of the data user and an association strategy between the identity information and the to-be-audited information,
 wherein performing the verification on the signature result according to a signature verification key comprises:
  determining a to-be-verified signature parameter according to a base point of a set elliptic curve, the signature verification key, the to-be-audited information, and a first key parameter and a second key parameter in the signature result; and
  in a case where the to-be-verified signature parameter matches the first key parameter, determining that the verification of the signature result passes;
 wherein a computing device of the data storage party comprises at least one of an access control layer or a data processing layer, and
 wherein the data processing layer is used for providing data for the data user, and the access control layer is located before the data processing layer and is used for performing verification on an access authority of the data user before providing the data for the data user.

6. The method according to claim 5, wherein initiating the data usage request to the data storage party comprises:
 calling the lease smart contract associated with the to-be-used data to determine an entrusted signer of the data owner associated with the to-be-used data;
 initiating a data authorization request comprising the to-be-audited information of the data user to the entrusted signer, and acquiring a signature result from the entrusted signer after the entrusted signer audits a data user according to the to-be-audited information of the data user; and
 initiating a data usage request carrying the signature result to the data storage party.

7. The method according to claim 5, wherein initiating the data usage request to the data storage party comprises:
 in a case where the to-be-used data is backed up and stored in at least two optional data storage parties, determining at least one target data storage party from the at least two optional data storage parties according to a health degree of each of the at least two optional data storage parties; and initiating the data usage request to the at least one target storage party, wherein the health degree is determined by calling the lease smart contract according to a historical task completion and/or historical heartbeat of the data storage party.

8. The method according to claim 5, wherein calling the lease smart contract associated with the to-be-used data to determine the data storage party of the to-be-used data comprises:

looking up a lease smart contract associated with the identification information of the to-be-used data in a blockchain network according to the identification information; and calling the lease smart contract to determine the data storage party of the to-be-used data.

9. A data storage party, comprising:

at least one processor; and a memory that is in a communication connection with the at least one processor;

wherein the memory stores instructions executable by the at least one processor, wherein the instructions are executed by the at least one processor to enable the at least one processor to perform:

in response to a data usage request initiated by a data user, acquiring a signature result fed back by an entrusted signer after the entrusted signer audits the data user according to to-be-audited information of the data user, wherein the entrusted signer is a signer of a data owner associated with to-be-used data and the to-be-audited information is determined according to identity information of the data user and an association strategy between the identity information and the to-be-audited information;

wherein the entrusted signer comprises at least two participants of at least one level, and the signature result is a threshold signature result of the at least two participants;

calling a lease smart contract according to the data usage request to determine a signature verification key of the entrusted signer;

performing verification on the signature result according to the signature verification key;

wherein performing the verification on the signature result according to a signature verification key comprises:

determining a to-be-verified signature parameter according to a base point of a set elliptic curve, the signature verification key, the to-be-audited information, and a first key parameter and a second key parameter in the signature result; and in a case where the to-be-verified signature parameter matches the first key parameter, determining that the verification of the signature result passes; and in a case where the verification passes, feeding back the to-be-used data to the data user, wherein a computing device of the data storage party comprises at least one of an access control layer or a data processing layer, and wherein the data processing layer is used for providing data for the data user, and the access control layer is located before the data processing layer and is used for performing verification on the access authority of the data user before providing the data for the data user.

10. A data user, comprising:

at least one processor; and a memory that is in a communication connection with the at least one processor;

wherein the memory stores instructions executable by the at least one processor, wherein the instructions are executed by the at least one processor to enable the at least one processor to perform the blockchain-based data processing method according to claim 5.

11. A non-transitory computer-readable storage medium storing computer instructions, wherein the computer instructions are used for enabling a computer to perform: the blockchain-based data processing method according to claim 1.

12. A non-transitory computer-readable storage medium storing computer instructions, wherein the computer instructions are used for enabling a computer to perform the blockchain-based data processing method according to claim 5.

* * * * *